(12) United States Patent
Nijhof et al.

(10) Patent No.: US 8,227,997 B2
(45) Date of Patent: *Jul. 24, 2012

(54) LAMP DRIVING CIRCUIT

(75) Inventors: Engbert Nijhof, Eindhoven (NL);
Marcel Johannes Maria Bucks, Eindhoven (NL); Jozef Petrus Emanuel De Krijger, Eindhoven (NL); Cong Khanh Pham, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 550 days.

This patent is subject to a terminal disclaimer.

(21) Appl. No.: 12/302,034

(22) PCT Filed: May 30, 2007

(86) PCT No.: PCT/IB2007/052028
§ 371 (c)(1),
(2), (4) Date: Nov. 24, 2008

(87) PCT Pub. No.: WO2007/138553
PCT Pub. Date: Dec. 6, 2007

(65) Prior Publication Data
US 2009/0115341 A1 May 7, 2009

(30) Foreign Application Priority Data
May 31, 2006 (EP) ..................... 06114768

(51) Int. Cl.
*H05B 41/14* (2006.01)
(52) U.S. Cl. .................... 315/246; 315/209 R; 315/226; 315/291; 315/307; 315/311
(58) Field of Classification Search ............. 315/209 R, 315/224, 246, 247, 291, 307, 311, 226
See application file for complete search history.

(56) References Cited

U.S. PATENT DOCUMENTS
4,912,374 A * 3/1990 Nagase et al. ................ 315/244
(Continued)

FOREIGN PATENT DOCUMENTS
DE 10238373 A1 3/2004
(Continued)

OTHER PUBLICATIONS
Joable Andrade Alves, et al: An Electronic Ballast With High Power Factor for Compact Fluorescent Lamps* Industry Applications Conf. 1996, Thirty-First-IAS Annual Meeting, IEEE San Diego, CA Oct. 6, 1996, vol. 4, pp. 2129-2135, XP000701554 ISBN 0-7803-3544-9.
(Continued)

*Primary Examiner* — Douglas W Owens
*Assistant Examiner* — Thai Pham
(74) *Attorney, Agent, or Firm* — Mark L. Beloborodov (57) ABSTRACT

In a lamp driving circuit for operating a high intensity discharge lamp, an a commutation circuit comprises at least two switching devices. The switching devices are alternately switched active at a commutation frequency. The active switching device switches at a switching frequency. During an ignition mode, the switching frequency and the commutation frequency are substantially equal. A resulting commutation voltage is supplied to an inverter resonant circuit for generating a supply current. At a node of the inverter resonant circuit, a clamping circuit limits the generated voltage to a predetermined maximum voltage. The voltage at said node of the inverter resonant circuit is applied to an output resonant circuit. The output resonant circuit operates in the ignition mode as a resonator for generating a high ignition voltage; in a steady state operation mode, the output resonant circuit operates as a low-pass filter for reducing a high frequency current component in a lamp current.

19 Claims, 3 Drawing Sheets

U.S. PATENT DOCUMENTS

| | | | |
|---|---|---|---|
| 6,020,691 A * | 2/2000 | Sun et al. | 315/307 |
| 6,380,694 B1 * | 4/2002 | Uchihashi et al. | 315/244 |
| 6,459,213 B1 * | 10/2002 | Nilssen | 315/224 |
| 6,577,078 B2 * | 6/2003 | Shen | 315/307 |
| 6,804,129 B2 * | 10/2004 | Lin | 363/98 |
| 7,218,066 B2 * | 5/2007 | Van Casteren | 315/307 |
| 2002/0140370 A1 | 10/2002 | Sun | |
| 2003/0015974 A1 | 1/2003 | Klier et al. | |
| 2004/0257001 A1 * | 12/2004 | Langeslag et al. | 315/209 R |
| 2005/0218833 A1 | 10/2005 | Kastle | |

FOREIGN PATENT DOCUMENTS

| | | |
|---|---|---|
| JP | 2000184743 A | 6/2000 |
| WO | 9851130 A1 | 11/1998 |

OTHER PUBLICATIONS

Henry Guldner, et al: Principles of electronic ballasts for fluorescent lamps—an overview, Power Electronics Specialists Conf. 1999, 30th Annual IEEE Charlston, SC, Jun. 27,1999, Piscataway, NJ USA IEEE, pp. 19-25, XP010346909 ISBN 0-7803-5421-4.

* cited by examiner

LAMP DRIVING CIRCUIT

FIELD OF THE INVENTION

The present invention relates to a lamp driving circuit and in particular to a commutating forward lamp driving circuit.

BACKGROUND OF THE INVENTION

A commutating forward lamp driving circuit is advantageously used for operating high intensity discharge (HID) lamps. In a forward commutating lamp driving circuit, a down-converter (forward converter) and a commutation circuit (inverter) are combined. Such a lamp driving circuit may be embodied in a half-bridge commutating forward (HBCF) topology or a full-bridge commutating forward (FBCF) topology.

Besides driving the discharge lamp in a steady state by providing a suitable lamp current, the lamp driving circuit needs to be configured for igniting the discharge lamp, requiring a high voltage. In particular, metal halide discharge lamps may extinguish after ignition due to e.g. electrode conditions. Therefore, preferably a lamp driving circuit is configured for fast re-ignition of an extinguished lamp without separate control such as used when using a pulse igniter as known from the prior art.

U.S. Pat. No. 6,380,694 discloses a HID lamp driving circuit. The lamp driving circuit uses two switching devices and an inductor/capacitance filter in a high frequency resonant mode to ignite the lamp. The high frequency resonant mode is continued for a predetermined period of time to provide a smooth transition from a glowing condition to an arcing condition. A further inductance/capacitance filter operates as a high frequency ripple-reducing filter for reducing a high frequency ripple in a lamp current during steady state operation. In the steady state operation a first set of switching devices is alternately controlled at a first high frequency, while a second set of switches is alternately controlled at a second low frequency.

OBJECT OF THE INVENTION

It is desirable to have a forward commutating lamp driving circuit and a corresponding method for operating an HID lamp, in which an extinguished HID lamp may easily be (re-)ignited.

SUMMARY OF THE INVENTION

In an aspect, the present invention provides a lamp driving circuit according to claim 1.

The lamp driving circuit according to the present invention employs resonant ignition. The inverter circuit generates a suitable supply current, which is supplied to the output resonant circuit. The output resonant circuit operates as a resonant circuit, when the lamp is extinguished, i.e. when there is no significant electrical load provided by the lamp between the output terminals. Due to the resonance, a high voltage is generated over the output terminals thereby providing a suitable ignition voltage.

After ignition, the output resonant circuit, or at least an inductive part thereof, operates as a low-pass filter circuit, reducing a (high) switching frequency ripple in order to generate a desirable lamp current alternating at the commutation frequency, which may be a low frequency square wave or may have any other suitable shape.

If the lamp extinguishes, for example during take-over phase and/or run-up phase after ignition (i.e. the phases following ignition), the output resonant circuit automatically generates a resonant ignition voltage in case the steady state operation mode has not yet started. A same effect is obtained if a lamp extinguishes during commutation of the lamp current e.g. during low frequency square wave operation, since the characteristics of the second resonant filter transfer to basically an inductance/capacitance filter when the lamp becomes a high impedance.

In order to allow the output resonant circuit to operate as described above, the inverter circuit supplies a suitable supply current. Thereto, the inverter circuit uses a commutation circuit comprising at least two switching devices. The switching devices are alternately switched active at a commutation frequency. Each switching device, when switched active, switches at a switching frequency. In steady state operation, the switching frequency is higher than the commutation frequency. The inactive switching device may carry the freewheel current when the active switching device is turned off and may thus be used as a rectifier, by using the internal body diode or by switching the inactive switching device conductive in a so-called dual MOSFET mode, as described below. A freewheel current frequency is the same as the switching frequency of the active switch. The resulting commutation voltage is supplied to the inverter resonant circuit.

As soon as the active switching device is switched conductive, a current in the inverter resonant circuit increases gradually due to the characteristics of the inverter resonant circuit. Then, the active switching device is switched non-conductive again. As a result, a freewheel current is generated in the inverter resonant circuit, flowing through a body diode of the other, non-active switching device. The freewheel current gradually decreases due to the characteristics of the inverter resonant circuit. After a period of time, the active switching device is switched conductive again, resulting in an increase of the current. Thus, an alternating current, substantially triangularly shaped, is generated at the switching frequency of the switching device.

At the commutation frequency, the switching devices are alternately switched active as mentioned above. Thus, the direction of the alternating current is commutated at the commutation frequency. As the output resonant circuit reduces the switching frequency current component, a substantially rectangular current at the commutation frequency is supplied to the output terminals. Deviations from a rectangular lamp current wave shape may be used and generated by a suitable control method of the switching devices of the commutation circuit, as will be appreciated by those skilled in the art.

In an ignition mode, the commutation frequency is selected to be equal to the switching frequency. Therefore, hereinafter, the frequency during the ignition mode may be referred to as an ignition frequency. When igniting the HID lamp, a first ignition frequency may be selected such that the clamping circuit will clamp the voltage at the node of the inverter resonant circuit, thereby limiting and stabilizing the voltage at said node. Thus, the switching devices as switched conductive alternately providing a relatively high alternating voltage to be supplied to the inverter resonant circuit. Starting from a suitably selected first ignition frequency and ramping up (or down) to a resonance frequency of the output resonant circuit results in a high ignition voltage at the output terminals. When the HID lamp has ignited, the voltage across the lamp decreases from the high voltage to a relatively low voltage. Upon detection of the low lamp voltage, the switching devices may be controlled according to the steady state operation mode, as described above. The above method of ignition detection is only one out of many possible embodiments to detect lamp breakthrough as known by the person skilled in the art.

When the lamp unexpectedly extinguishes, a lamp current decreases substantially zero. Upon detection of such a small lamp current, the switching devices may be controlled according to the ignition mode, until the lamp has re-ignited.

An advantage of the lamp driver circuit according to the present invention is found in the substantially rectangular shape of the alternating voltage during ignition having a relatively large 3rd harmonic signal content. In particular, the large 3rd harmonic signal is advantageously used during the ignition mode for igniting the HID lamp, as is described below.

In an embodiment at least two switching devices are MOSFETs operated in a dual MOSFET mode, as known to a person skilled in the art. In dual MOSFET mode, the inactive switching device is actively controlled, when the active switching device is switched non-conductive. Therefore, hereinafter, the active switching device may be referred to as a master switching device and the inactive switching device may be referred to as a slave switching device. However, it is noted that, in the present description and appended claims, a reference to an inactive switching device includes a reference to an actively controlled switching device operating as slave in a dual MOSFET mode.

As described above, a freewheel current may flow through the body diode of the slave switching device (MOSFET). In dual MOSFET mode, the freewheel current through the body diode of the slave MOSFET is gradually taken over by an active conduction path of the slave MOSFET by switching the slave MOSFET conductive. As soon as the current flowing through the inverter resonant circuit reaches zero, the slave MOSFET is switched non-conductive again. In dual MOSFET operation, the circuit is configured to generate a (small) shoot through of the current through zero. As a result the commutation voltage has a swing from a first rail voltage to the opposite rail voltage in order to achieve zero-voltage switching of the master switching device. Further, as a result, the body diode of the slave is cleared from a surplus of charge carriers, enabling favorable reverse mode operation of the body diode. Thereafter, the master MOSFET is switched conductive again. Thus, the body diode of the slave MOSFET is protected against damage due to high voltages and currents and against high losses, i.e. well-known aspects associated with clearing a MOSFET switching device from a surplus of charge carriers (also known as reverse recovery).

In order to enable fast commutation, which has been found to be advantageous for driving HID lamps, such as metal halide lamps, in an embodiment, the capacitance of the inverter resonant circuit is selected to be small. The capacitance of the inverter resonant circuit operates as a buffer tank. With a small buffer, a commutation may be performed relatively fast.

It is noted that with small capacitors in the inverter resonant circuit and in particular with operating modes at high current values in the inverter inductor, e.g. during ignition, the voltage at the node of the inverter resonant circuit could exceed the rail voltage, which would lead to a current reversal. The clamping circuit limits the voltage at said node to the rail voltage, thereby preventing a reversing of the current in the inverter inductor. This is advantageous, since switching a switching device when the current through the inverter inductor is in the above-mentioned reverse direction may lead to hard switching of the switching device.

In an embodiment, the present invention further provides a lamp driving circuit according to claim 16. The embodiment of the lamp driving circuit is particularly suitable for an application in which a relatively long cable wiring is employed for coupling the lamp driving circuit and the lamp.

In an aspect the present invention further provides a method according to claim 17 and a method according to claim 18.

BRIEF DESCRIPTION OF THE DRAWINGS

Hereinafter the present invention is elucidated in more detail with reference to the appended drawings illustrating non-limiting embodiments, wherein.

DETAILED DESCRIPTION OF EXAMPLES

Figure 1:
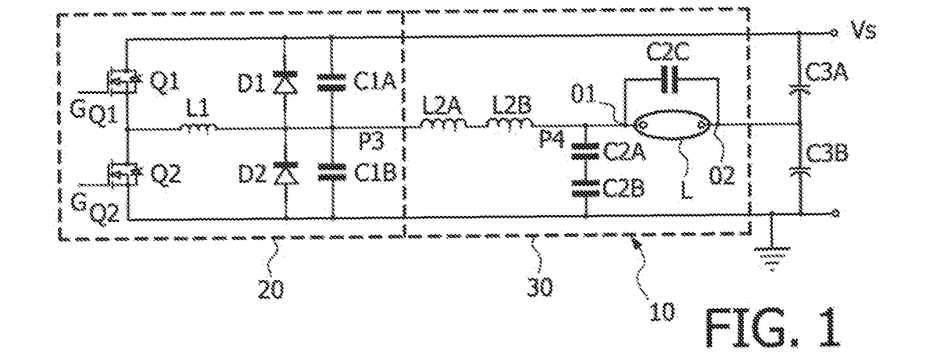
FIG. 1 shows a circuit diagram of an embodiment of a lamp driver circuit according to the present invention.

In the drawings like reference numerals refer to like components. FIG. 1 shows an embodiment of a lamp driving circuit 10 according to the present invention. The lamp driving circuit 10 comprises an inverter circuit 20 and an output circuit 30. The inverter circuit 20 comprises a first switching device Q1 and a second switching device Q2. Each switching device Q1, Q2 is a MOSFET having a body diode. The switching devices Q1, Q2 are controlled by a control circuit (not shown) connected to a gate GQ1, GQ2 of the respective switching devices Q1, Q2. The switching devices Q1, Q2 form a commutation circuit. The inverter circuit 20 further comprises an inverter resonant circuit comprising an inverter inductance L1 and an inverter capacitance C1 formed by the capacitors C1A, C1B. The inverter resonant circuit is connected to a node P1 of the commutation circuit. A clamping circuit comprising a first clamping diode D1 and a second clamping diode D2 is connected to a node P3 of the inverter resonant circuit.

The output circuit 30 comprises an output resonant circuit comprising an output inductance L2 and an output capacitance C2 comprising output capacitors C2A, C2B, C2C, the output capacitor C2C being formed by a lamp capacitance and parasitic capacitances. The output inductance L2 is illustrated to be embodied by two separate inductors L2A, L2B. However, the output inductance may be embodied as one inductor. Therefore, hereinafter reference is made to an output inductor L2, which is intended to refer to both inductors L2A and L2B. The same applies to the output capacitance C2. The output circuit 30 further comprises two output terminals O1, O2. A HID lamp L is connected between said output terminals O1, O2. The second output terminal O2 is connected to a node P5 of a capacitive voltage divider comprising the voltage divider capacitors C3A and C3B.

A supply voltage Vs is provided at a suitable terminal of the lamp driving circuit 10. At another terminal the lamp driving circuit 10 is connected to ground. Thus, a supply voltage Vs is applied over input terminals of the lamp driving circuit 10.

Operation of the lamp driving circuit 10 according to FIG. 1 is elucidated with reference to FIGS. 2-4B.

Steady State Operation

Figure 2:
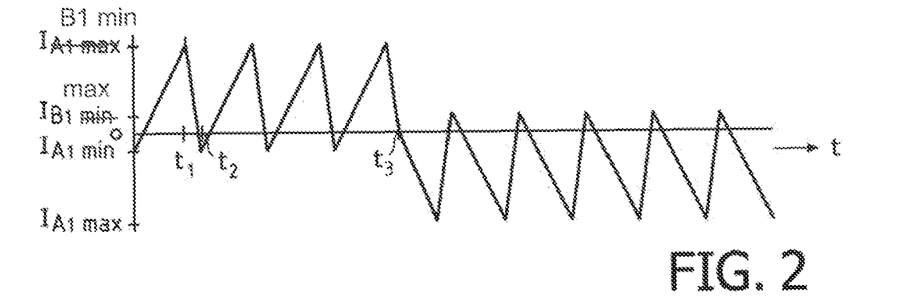
FIG. 2 shows a timing diagram of an inverter current in the lamp driving circuit according to FIG. 1 during a steady state operation mode.

FIG. 2 shows a timing diagram of an inverter inductor current flowing through the inverter inductor L1 during a steady state operation. Referring to FIG. 1 and FIG. 2 the inverter inductor current represents a supply current generated by the inverter circuit 20. At time t0 the control circuit controls the master switching device Q1 to switch conductive. Consequently, a current starts to develop through the inverter inductor L1. The current increases to a level $I_{A,max}$. At time $t_1$ the master switching device Q1 is switched non-conductive. The inverter inductor L1 attempts to maintain the developed current, resulting in a freewheel current flowing through the body diode of the slave switching device Q2.

In a dual MOSFET operation mode, the switching device Q2 is then switched conductive, resulting in the freewheel current flowing through the MOSFET and reducing the freewheel current through the body diode of switching device Q2. The freewheel current gradually decreases and reaches zero and is then reversed in direction. The slave switching device Q2 is switched non-conductive and the reversed freewheel current generates a resonant swing of the voltage at node P1 to the opposite rail voltage. Thus, in dual MOSFET mode, disadvantages of use of the body diode, such as a relatively large forward loss and a relatively bad turn-off loss are circumvented.

At time $t_2$, when the current is at the level $I_{A,min}$, the master switching device Q1 is switched conductive again. Thus, in a first commutation interval A, the inverter inductor current alternates between a minimum level $I_{A,min}$ and a maximum level $I_{A,max}$ at a frequency equal to the switching frequency of the master switching device Q1. The switching of the master switching device Q1 is repeated until time $t_3$.

At time $t_3$, the second switching device Q2 is made master and the first switching device is made slave. Thus, at time $t_3$, the current is commutated and a second commutation interval B is started. During commutation interval B, the inverter inductor current alternates between the minimum level $I_{B,min}$ and the maximum level $I_{B,max}$. Due to the buffering of the inverter capacitance C1A, C1B and the low-pass filtering by the output inductance L2 in combination with the impedance of the arcing HID lamp, the switching frequency signal in the inverter inductor current is reduced and a substantially rectangular shaped current alternating between the levels $I_{A,max}$ and $I_{B,max}$ results as a lamp current supplied to the output terminals O1, O2 and the lamp L connected therebetween. The frequency of the low frequency alternating, e.g. rectangular shaped, current is equal to the frequency used for switching the first and the second switching devices Q1, Q2 master and slave. This frequency is referred to as the commutation frequency.

Ignition Mode

Figure 3A:
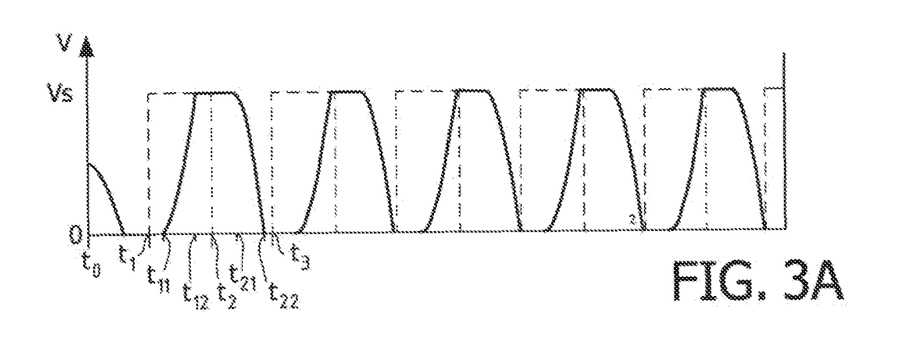
FIG. 3A shows a timing diagram of a first voltage and a second voltage in the lamp driving circuit according to FIG. 1 at a starting frequency during an ignition mode.
Figure 3B:
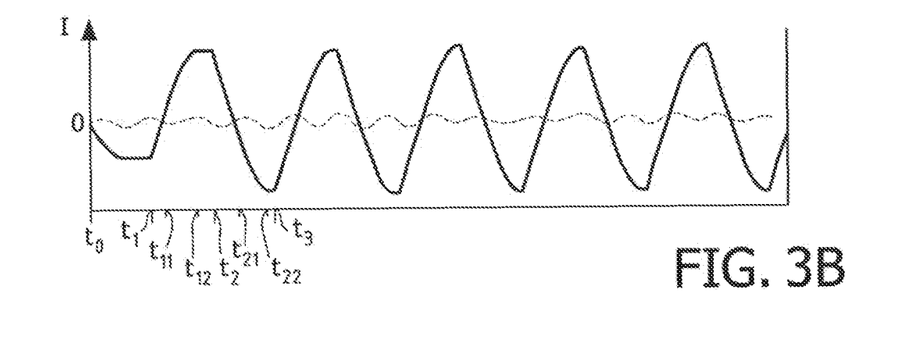
FIG. 3B shows a timing diagram of a first current and a second current in the lamp driving circuit according to FIG. 1 at a starting frequency during an ignition mode.

FIG. 3A shows a timing diagram of a commutation voltage at node P1 (dashed line) and an inverter voltage at node P3 of the inverter resonant circuit (solid line) during an ignition mode of the lamp driving circuit 10 according to FIG. 1. FIG. 3B shows a timing diagram of the inverter inductor current flowing through the inverter inductor L1 (solid line) and an output inductor current flowing through the output inductance L2 (dashed line) during an ignition mode of the lamp driving circuit 10 according to FIG. 1.

Referring to FIG. 1 and FIG. 3A, in the ignition mode, the commutation frequency and the switching frequency are equal and is hereinafter referred to as an ignition frequency. Thus, the switching devices Q1 and Q2 are alternately switched conductive. Consequently, a rectangular voltage alternating between the voltage of the positive voltage terminals (Vs, i.e. a first rail voltage) and the voltage of the negative terminal (ground, i.e. a second rail voltage) is present at node P1. At time t0, the commutation voltage at node P1 is zero and at time $t_1$, the commutation voltage increases to a supply voltage level Vs. At time $t_2$, the commutation voltage decreases to zero again.

Referring to FIGS. 1, 3A and 3B, the inverter inductor current gradually increases following the increase of the commutation voltage at time t1. When the inverter inductor current becomes positive at time $t_{11}$, the inverter voltage at node P3 starts to increase. The inverter voltage tends to increase, while the first switching device Q1 is switched conductive in the time interval $[t_1, t_2]$. However, at time $t_{12}$, the inverter voltage is limited by the first diode D1 to a predetermined maximum voltage level, in casu substantially the supply voltage level, since the first diode D1 starts to conduct as soon as the inverter voltage becomes higher than the supply voltage Vs. Thus, the first diode D1 of the clamping circuit stabilizes the inverter voltage.

At time t2, the commutation voltage at node P1 decreases to zero and consequently, the inverter inductor current starts to gradually decrease. At time $t_{21}$, the current reaches zero and the inverter voltage starts to gradually decrease. At time $t_{22}$ the inverter voltage has become zero. At time $t_3$ the first switching device Q1 is switched conductive again and the above sequence is repeated.

Figure 4A:
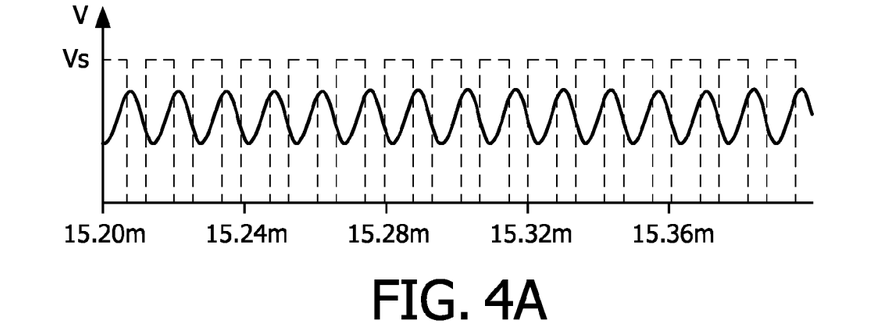
FIG. 4A shows a timing diagram of a first voltage and a second voltage in the lamp driving circuit according to FIG. 1 at a resonance frequency during an ignition mode.
Figure 4B:
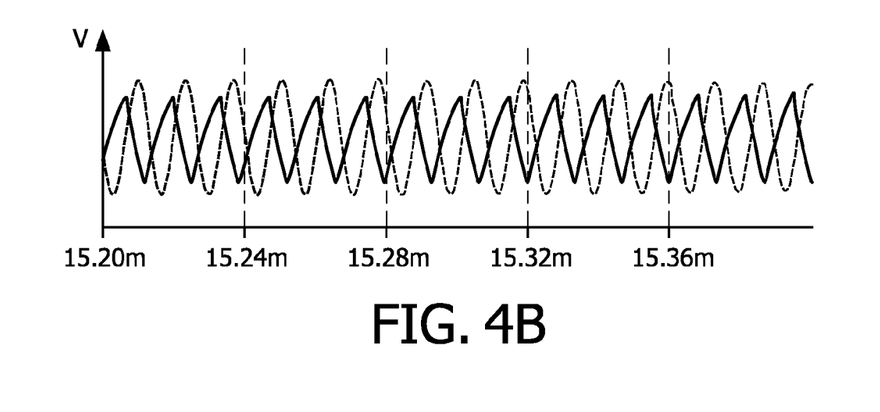
FIG. 4B shows a timing diagram of a first current and a second current in the lamp driving circuit according to FIG. 1 at a resonance frequency during an ignition mode.

As can been seen from the output inductor current (dashed line) in FIG. 3B, only a small current flows through the output inductance L2, when the ignition mode is started at a relatively low ignition frequency. The relatively low starting ignition frequency is, however, selected below the resonance frequency of the output resonant circuit comprising the output inductance L2 and the output capacitance C2. In order to bring the output resonant circuit into resonance, the ignition frequency is ramped up, while a lamp voltage, i.e. a voltage over the output terminals O1 and O2 is sensed. The ignition frequency is increased until the lamp voltage reaches a predetermined voltage level suitable for igniting an HID lamp. Then the ignition frequency equal to the determined resonance frequency is maintained until the lamp breaks down and ignites. In FIG. 4A, the commutation voltage (dashed line) and the inverter voltage (solid line) at the resonance frequency are shown. In FIG. 4B, the inverter inductor current (solid line) and the output inductor current (dashed line) at the resonance frequency are shown.

Figure 5:
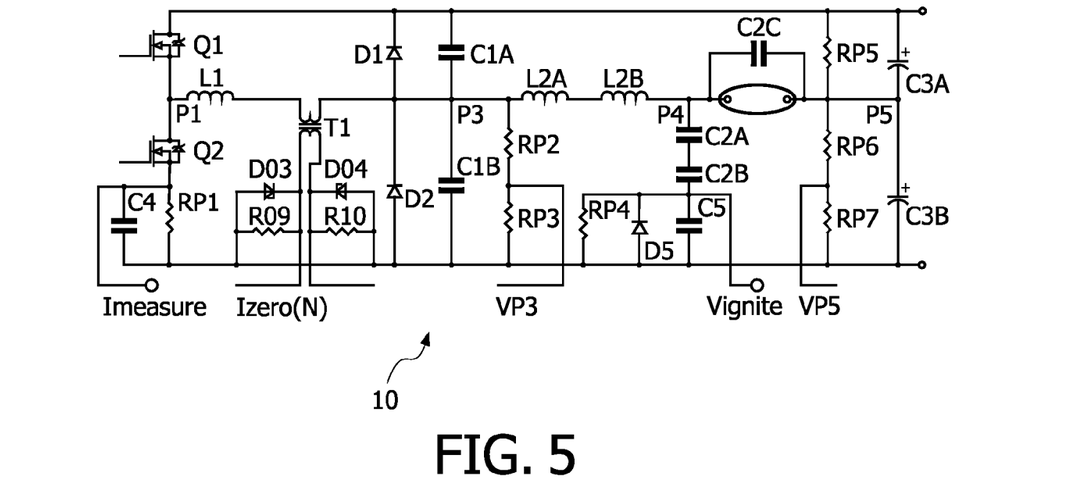
FIG. 5 shows a circuit diagram of the embodiment according to FIG. 1 including sensing circuitry for controlling the lamp driving circuit.

FIG. 5 shows the lamp driving circuit 10 according to FIG. 1 again. In the diagram of FIG. 5 a number of components are added, which components are employed for sensing a number of voltages and currents during operation. The sensed voltages and currents are supplied to the control circuit for control of the operation of the lamp driving circuit 10.

A first sensing circuit comprises a resistor RP1 connected in parallel with a capacitor C4. The first sensing circuit is connected in series with the second switching device Q2. The first sensing circuit is employed for determining a generated current ($I_{measure}$), representative of a lamp current. If the lamp was ignited and thereafter the average current is sensed to be below a predetermined threshold value, it is determined that the lamp has extinguished. In response, the control circuit may switch to the ignition mode.

A second sensing circuit comprises a transformer T1 having a small number of windings per coil. A first coil is connected in series with the inverter inductor L1. Each terminal of the second coil is connected to the negative supply terminal via a parallel connection of a diode D03 and D04, respectively, and a resistor R09 and R10, respectively. With a relatively large inverter inductor current, the transformer T1 is saturated and does not provide a suitable sensing signal. However, when the current is almost zero, the transformer T1 is not saturated and supplies a signal. Thus, the transformer T1 is used for sensing a zero current of the inverter inductor current ($I_{zero(N)}/I_{zero(P)}$), which may be employed for switching a switching device conductive.

A third sensing circuit comprises a resistive voltage divider of a resistor RP2 and a resistor RP3 connected between the node P3 of the inverter resonant circuit and the negative supply voltage terminal. Thus, the inverter voltage (VP3) at node P3 is sensed.

A fourth sensing circuit comprises a resistive voltage divider of a resistor RP6 and a resistor RP7 connected between the node P5 (i.e. output terminal O2) and the negative supply voltage terminal. Thus, the voltage (VP5) at node P5 is sensed.

A fifth sensing circuit comprises a parallel circuit of a resistor RP4, a diode D5 and a capacitor C5. The parallel circuit is connected in series to the capacitors C2A and C2B for sensing an ignition voltage ($V_{ignite}$). When the sensed ignition voltage drops significantly during the ignition mode, it is determined that the lamp L breaks down and ignites. In response, the control circuit may switch to the steady state operation mode immediately or after a predetermined period of time.

It is noted that the above described and in FIG. 5 illustrated sensing circuits may be embodied differently. Further, it is considered that the above description of the operation of the lamp driving circuit 10 provides sufficient information to a person skilled in the art for selecting components having a suitable impedance, capacitance, inductance, resistance, etc. It is noted that a suitable commutation frequency may be in the order of 400 Hz; a suitable switching frequency may be in the order of 100 kHz; a suitable starting ignition frequency may be in the order of 29 kHz; and a suitable resonance ignition frequency may be in the order of 75 kHz.

It is noted that the actual switching frequency during ignition, i.e. the ignition frequency, may be a fraction, such as a third, of the resonance frequency, provided that the voltage supplied to the output resonant circuit has a sufficient harmonic content, e.g. third harmonic signal content. As mentioned above, the lamp driving circuit according to the present invention may provide such a sufficient third harmonic signal content. Therefore, the actual frequency sweep during the ignition mode may be from 40 kHz to 20 kHz, while the resonance frequency may lie in a range from 120 kHz-60 kHz. When the actual switching frequency approaches a frequency equal to a third of the resonance frequency, the output resonant circuit may start to resonate due to the third harmonic signal content, thereby generating a suitable ignition voltage.

Figure 6:
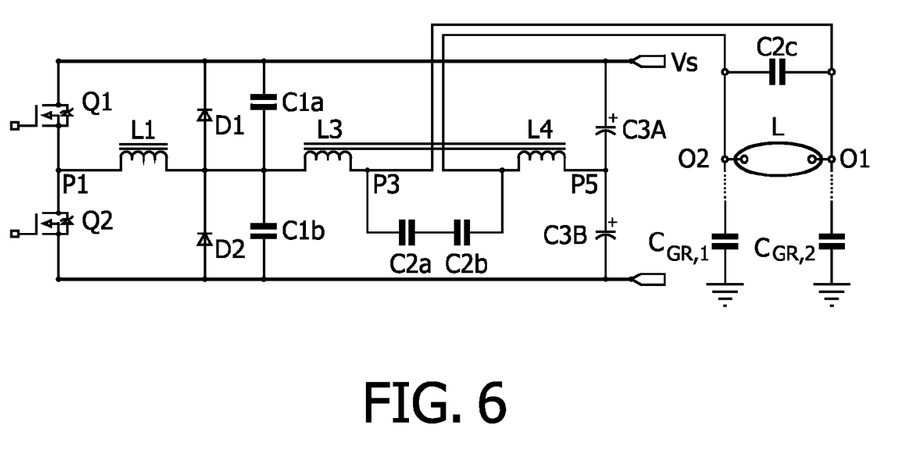
FIG. 6 shows a circuit diagram of another embodiment of the lamp driving circuit according to the present invention.

FIG. 6 illustrates another embodiment of a lamp driving circuit 40 according to the present invention. The embodiment of FIG. 6 is particularly suitable for use in an application in which the lamp driving circuit 40 is arranged at a relatively large distance from the lamp L, thus having a relatively long cable wiring provided between the lamp driving circuit 40 and the lamp L. Such an application may be a lamp post, for example.

In the embodiment of FIG. 6, two inductors L3, L4 are comprised in the output resonant circuit (cf. the output inductance L2 in the embodiment of FIGS. 1 and 5). The third inductor L3 and the fourth inductor L4 are separated. The third inductor L3 is connected with the first output terminal O1; the fourth inductor L4 is connected with the second output terminal O2. The output capacitance C2 comprising capacitors C2a, C2b, C2c is connected in parallel with the output terminals O1 and O2 and hence with the lamp L. The capacitor C2c represents the lamp capacitance and parasitic capacitances in the circuit, such as a capacitance present in cable wiring from the lamp driving circuit 40 to the lamp L, for example. Hence, in an embodiment in which the cable wiring to the lamp L is increased, such as in e.g. a lamppost, the capacitance of the capacitor C2c is increased compared to an embodiment in which the lamp L is connected through a short wire. This does, however, not influence the correct operation of the lamp driving circuit 40 according to the present invention substantially.

Long wiring may introduce a further parasitic capacitance $C_{GR,1}$, $C_{GR,2}$ present between the wires and ground. The parasitic capacitors $C_{GR,1}$, $C_{GR,2}$ is shown to be present between ground and the first output terminal O1 and the second output terminal O2, respectively. The parasitic capacitors $C_{GR,1}$, $C_{GR,2}$ may influence the operation of the lamp driving circuit 40 during ignition mode. If an (alternating) high voltage is generated at one of the output terminals, e.g. output terminal O1, a current flows from the output terminal O1 to ground through the capacitor $C_{GR,1}$. Due the high voltage, this current may be a high current which may return to the lamp driving circuit 40 through an unknown ground (earth) impedance and a common mode filter of a power factor correction circuit (inductance). In such a resonant circuit the current returning to the lamp driving circuit 40 may significantly damp or disturb the original resonant ignition circuit due to which no well controlled ignition voltage is applied to the lamp L.

Referring to FIG. 6 again, in the ignition mode, an alternating high voltage is generated between the output terminals O1 and O2 for igniting the HID lamp L. Using two substantially similar inductors L3 and L4, preferably magnetically coupled as illustrated, a substantially same alternating high voltage is generated at each output terminal O1, O2. Further, the circuit is configured such that the alternating voltage at output terminals O1 has an opposite polarity compared to the alternating voltage at output terminal O2 (180° phase shifted). Hence, the voltage between the output terminals O1 and O2 is twice as high as the alternating voltage at each separate output terminal O1, O2.

Further, during the ignition mode, due to the alternating high voltages at the output terminals O1, O2, a parasitic current flows from the output terminal O1 to ground and a parasitic current flows from ground to the output terminal O2. Since the voltages at the output terminals O1 and O2 are substantially the same, only having an opposite polarity, the current flowing from the first output terminal O1 to ground may flow through ground to the second output terminal O2. Hence, the current flowing to ground does not return to the lamp driving circuit 40, as described above, thereby preventing that the ignition voltage is damped or disturbed or that parts of the lamp driving circuit are disturbed by the return current.

Further, due to, inter alia, the construction of the HID lamp and an influence of external factors like a fixture and the surrounding earth (ground), in HID lamps, there may be a difference during the ignition of the HID lamp depending on at which electrode the ignition voltage is applied. The above lamp driving circuit configuration takes away this disadvantage, since except for the phase shift the voltage at each electrode is substantially the same. This is advantageous in particular in outdoor applications. In outdoor applications like lamp posts, the lamp wires may be connected to the lamp driving circuit at a lower end of the lamp post by a less skilled person and/or a person working under difficult conditions such as bad lighting conditions, wind, rain, cold, heat.

A further advantage is found in that the third and fourth inductors L3 and L4 form a symmetrical filter. If the third and fourth inductors L3 and L4 are magnetically coupled the magnetic component can be tuned to have a specific value for the leakage inductance.

It is noted that the separation of the output inductance into two separated inductors may as well be advantageously employed in any other lamp driving circuit e.g. for operating a HID lamp, in particular in a lamp driving circuit employing resonant ignition and having a relatively long cable wire between the lamp driving circuit and the lamp. Therefore, the separation of the output inductance is not limited to a lamp driving circuit according to the present invention.

Although detailed embodiments of the present invention are disclosed herein, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Further, the terms and phrases used herein are not intended to be limiting; but rather, to provide an understandable description of the invention. The terms "a" or "an", as used herein, are defined as one or more than one. The term another, as used herein, is defined as at least a second or more. The terms including and/or having, as used herein, are defined as comprising (i.e., open language). The term coupled, as used herein, is defined as connected, although not necessarily directly, and not necessarily by means of wires.

The invention claimed is:

1. A lamp driving circuit for operating a high-intensity discharge (HID) lamp, the lamp driving circuit comprising:
   a supply voltage terminal for receiving a supply voltage;
   an inverter circuit coupled to the supply voltage terminal, the inverter circuit comprising:
      a commutation circuit for generating a commutation voltage, the commutation circuit comprising at least two switching devices, the switching devices being configured to operate alternately at a commutation frequency, each switching device being configured to operate at a switching frequency, wherein the switching frequency is substantially equal to the commutation frequency during an ignition mode and the switching frequency is higher than the commutation frequency during a steady state mode;
      an inverter resonant circuit coupled to the commutation circuit for receiving the commutation voltage for generating a supply current at a node; and
      a clamping circuit coupled to the inverter resonant circuit for limiting a voltage at the node of the inverter resonant circuit to a predetermined maximum voltage level; and
   an output circuit coupled to the inverter circuit for receiving the supply current, the output circuit comprising:
      an output resonant circuit for generating an ignition voltage for igniting the lamp in the ignition mode, and for reducing a switching frequency ripple in the supply current in order to generate a commutation frequency output current, when operating the lamp in the steady state mode; and
      a set of output terminals for supplying the output current to the HID lamp.

2. The lamp driving circuit according to claim 1, wherein the at least two switching devices comprise two MOSFET transistors operating in a dual MOSFET mode.

3. The lamp driving circuit according to claim 2, wherein a current sensing device is provided at said node of the inverter resonant circuit for switching a MOSFET conducting, when a freewheel current reverses direction.

4. The lamp driving circuit according to claim 1, wherein the inverter resonant circuit comprises an inverter inductance and an inverter capacitance connected in series and coupled to an output of the commutation circuit.

5. The lamp driving circuit according to claim 4, wherein the inverter capacitance is relatively small for enabling a fast commutation.

6. The lamp driving circuit according to claim 1, wherein the clamping circuit comprises a clamping diode connected to said node of the inverter resonant circuit.

7. The lamp driving circuit according to claim 4, wherein the clamping circuit comprises a clamping diode connected in parallel to the inverter capacitance of the inverter resonant circuit.

8. The lamp driving circuit according to claim 1, wherein the output resonant circuit comprises an output inductance and an output capacitance connected in series and coupled to an output of the inverter circuit.

9. The lamp driving circuit according to claim 8, wherein the output inductance is connected between the output of the inverter circuit and one terminal of the set of output terminals.

10. The lamp driving circuit according to claim 8, wherein the output capacitance comprises an output capacitor connected to a terminal of the output inductance.

11. The lamp driving circuit according to claim 8, wherein the output inductance comprises a third inductor and a fourth inductor, the third inductor being connected to a first output terminal and the fourth inductor being connected to a second output terminal such that during ignition an alternating high voltage is generated at the first output terminal and an alternating high voltage having an opposite polarity is generated at the second output terminal.

12. The lamp driving circuit according to claim 11, wherein the third inductor and the fourth inductor are magnetically coupled.

13. The lamp driving circuit according to claim 12, wherein the output capacitance is connected in parallel with the first and second output terminals.

14. The lamp driving circuit according to claim 1, wherein the lamp driving circuit comprises a control device for controlling the high frequency switching devices such that one of the switching devices is active and another is inactive alternately at the commutation frequency and such that the active switching device switches at the switching frequency.

15. The lamp driving circuit according to claim 14, wherein the control device is configured to control the switching devices at the switching frequency substantially equal to the commutation frequency during the ignition mode and to control the switching devices at the switching frequency higher than the commutation frequency during the steady state operation mode.

16. A lamp driving circuit for operating a high-intensity discharge (HID) lamp, the lamp driving circuit being configured for generating an ignition voltage for igniting the HID lamp, the driving circuit comprising:

a resonant circuit comprising an inductance and a capacitance, wherein the inductance comprises a first inductor and a second inductor, the first inductor being arranged to be coupled to a first lamp terminal of the HID lamp and the second inductor being arranged to be coupled to a second lamp terminal of the HID lamp such that during ignition a first alternating high voltage is generated at the first lamp terminal and a second alternating high voltage having an opposite polarity compared to the first alternating high voltage is generated at the second lamp terminal, and wherein the first and second alternating high voltages at the first and second lamp terminals of the HID are substantially the same, and a voltage between the first and second output terminals is twice as high as each of the first and second alternating high voltages.

17. A method of operating a high-intensity discharge HID lamp, the method comprising:

generating a commutation voltage alternating at a switching frequency and commutating at a commutation frequency, the switching frequency being substantially equal to the commutation frequency during an ignition mode and higher than the commutation frequency during a steady state mode;

generating a supply current from the commutation voltage using an inverter resonant circuit at a node of the inverter resonant circuit;

clamping a voltage at the node of the inverter resonant circuit to a predetermined maximum voltage level;

generating an ignition voltage from the supply current using an output resonant circuit, when igniting the lamp;

generating a commutation-frequency output current using the output resonant circuit, when the lamp operates in a steady state.

18. A method for igniting a gas discharge lamp, the method comprising:

generating a first alternating high voltage at a first lamp terminal of the gas discharge lamp; and generating a second alternating high voltage at a second lamp terminal of the gas discharge lamp, the second alternating high voltage having an opposite polarity compared to the first alternating high voltage, wherein the first and second alternating high voltages at the first and second lamp terminals are substantially the same, and a voltage between the first and second output terminals is twice as high as each of the first and second alternating high voltages.

19. The lamp driving circuit according to claim 1, wherein the switching devices alternate between operating as master switching device and slave switching device at the commutation frequency during the steady state mode.

* * * * *